United States Patent [19]

Shotbolt

[11] 4,417,830
[45] Nov. 29, 1983

[54] CONNECTOR ASSEMBLY

[75] Inventor: Keith Shotbolt, London, England

[73] Assignee: Constructors John Brown Limited, Paddington, England

[21] Appl. No.: 232,547

[22] Filed: Feb. 9, 1981

[30] Foreign Application Priority Data

Feb. 11, 1980 [GB] United Kingdom ................ 8004493

[51] Int. Cl.³ ........................ E02B 3/16; E16L 35/00
[52] U.S. Cl. .................................... 405/169; 166/342; 405/195; 405/224
[58] Field of Search ............... 405/224, 202, 168, 169, 405/225-227; 166/338-349

[56] References Cited

U.S. PATENT DOCUMENTS

| | | |
|---|---|---|
| 3,050,139 | 8/1962 | Hayes . |
| 3,050,140 | 8/1962 | Hayes .............................. 166/341 X |
| 3,163,228 | 12/1964 | Hayes .............................. 166/340 X |
| 3,168,142 | 2/1965 | Watkins et al. . |
| 3,168,143 | 2/1965 | Watkins ............................... 166/341 |
| 3,265,130 | 8/1966 | Watkins . |
| 3,301,324 | 1/1967 | Smith . |
| 3,355,899 | 12/1967 | Koonce et al. ...................... 405/202 |
| 3,424,241 | 1/1969 | Triplett ............................... 166/340 |
| 3,592,014 | 7/1971 | Brown ............................ 166/343 X |
| 3,618,661 | 11/1971 | Peterman . |
| 3,626,527 | 12/1971 | Brown ............................ 166/349 X |
| 3,729,941 | 5/1973 | Rochelle ............................. 405/169 |
| 3,967,462 | 7/1976 | DeJong ........................... 166/343 X |
| 4,120,171 | 10/1978 | Chateau et al. ...................... 405/169 |
| 4,226,555 | 10/1980 | Bourne et al. ....................... 405/224 |

FOREIGN PATENT DOCUMENTS 1300771 12/1972 United Kingdom .
1300772 12/1972 United Kingdom .
1494926 12/1977 United Kingdom .

Primary Examiner—Dennis L. Taylor
Attorney, Agent, or Firm—Bacon & Thomas

[57] ABSTRACT

A connector assembly comprises first and second connecting parts which are oriented for joining by a guide post and a cable having a hydraulic hose core terminating in a radially expandable mandrel. The cable is threaded through a bore in the second connecting part and located in the bore of the guide post by a hydraulic latch. The cable is tensioned and the second connecting part slid along the cable to the receive guide post in the opening thus orienting the two connecting parts for proper connection.

13 Claims, 4 Drawing Figures

CONNECTOR ASSEMBLY

FIELD OF THE INVENTION

The present invention relates to a connector assembly.

BACKGROUND OF THE INVENTION

It is in many circumstances encountered in a wide variety of activities difficult to align two connecting parts of a connector assembly for proper connection. A particular example of such circumstances is the attachment to undersea anchors of tubular or otherwise hollow members suspended from the surface, particularly if the water depth is large. This type of problem is frequently encountered in the exploitation of undersea gas and oil reserves, particularly in the guidance and connection of compliant vertical marine structures, e.g. single anchor leg moorings, articulated columns, tension leg platform moorings, to a seabed foundation.

Offshore oil and gas fields have been developed in water depths to 200 meters, which is generally considered to be the working limit for divers in flexible suits and who are therefore subjected to ambient pressure of about 21 atmospheres. Well drilling has progressed to water depths up to 1500 meters, and remotely-controlled vehicles (RCV's) with television cameras and manipulators have been developed for performing work required below 200 meters depth. RCV's may also replace divers for many tasks in shallower water.

Structures for the support of wellheads, separation, gas flaring, and tanker loading equipment have been designed, and in the cases of gas flaring and tanker loading installed, which have a compliant or articulating connection to a seabed foundation and depend on buoyancy to maintain the structure in a close to vertical, stable configuration. These structures are generally more feasible for installation in deeper water than fixed structures which do not have buoyancy, and which depend on their own stiffness and strength to support equipment.

For some compliant structures, the seabed foundation is installed prior to structure arrival on site. The foundation may be of a gravity type, i.e. dependent on self-weight to maintain position, or piled, either by driving or drilling. Means are usually provided on the foundation to allow the structure to connect to it.

The structure is generally hollow and sufficiently long to extend from the seabed to the surface. When the structure arrives on site, it will usually have a universal joint (e.g. a Hooke's joint or a bonded rubber flexjoint) and connector attached at the lower end, and may be floating in a horizontal position on the surface. Buoyancy adjustment along the structure length will allow it to swing from the horizontal to vertical position so that the universal joint and connector are some tens of feet above the seabed.

Once in the vertical position, floating or virtually suspended over the foundation, wind and current forces must be counteracted to prevent drifting. Surface vessels with lines attached to the structure can maintain it within a radius of tens of feet around the correct position directly over the foundation connection point by using sonar transponders.

To make a successful connection between the lower part of the universal joint and the foundation, the former must be brought to a position directly above the connection means mounted on the latter. It is also preferable for the connector of the lower part of the universal joint, and the connection means on the foundation, to be correctly aligned both laterally and angularly, before mating. These operations should not involve the use of divers, and should be practically independent of water depth.

BRIEF DESCRIPTION OF THE INVENTION

The present invention provides a connector assembly comprising first and second connecting parts together with means for aligning the connecting parts for connection together, the first connecting part having a guide post and the second connecting part having means for receiving the guide post such that when the guide post is received, the first and second connecting parts are laterally and angularly oriented for connection, wherein the alignment means comprises a line provided with a remotely releasable latching means adapted to be releasably attached to the guide post so that the line extends therefrom and wherein the line may be passed through the receiving means of the second connecting part and the second connecting part may then be slid down the line so that the guide post is thereby brought into the receiving means and the two parts thereby oriented for connection and after connection the latching means may be released and the line withdrawn through the second connecting part.

Preferably the latching means is actuateable remotely both to attach and release the line to and from the guide post.

Preferably the latching means is releasable by fluid pressure. In such a case the line preferably comprises a hydraulic hose for actuation of the latching means.

For instance the line may comprise a cable having a hydraulic hose core.

It may be that the latching means is a radially expandable portion provided on a mandrel attached at the end of the line and attachment is made to the guide post by engagement of the radially expandable portion in the guide post.

On the other hand it may be that the latching means comprises gripping means at the end of the line and attachment is made to the guide post by engagement of the gripping means over a part of the guide post.

Preferably, the first connecting part comprises a socket having the guide post extending through the socket mouth.

Preferably, in such a case, the second connecting part comprises a plug adapted to be received in said socket and the receiving means is a bore therein, a continuation of said bore allowing passage of the line through the second connecting part.

Preferably also, the second connecting part comprises connecting means for forming the connection between the first and second connecting parts, this may be remotely actuable e.g. hydraulically operated.

For undersea operations it may be that the first connecting part is provided in an anchor member for mounting on the seabed.

The second connecting part may be provided at the end of a hollow marine structure and a flexible (e.g. universal) joint may be provided between the structure and the second connecting part.

Examples of suitable hollow marine structures are tubular tension moorings, articulated columns, blow out preventers and tubular risers.

The invention includes a guide post for incorporation in a connecting part and an alignment means as defined above.

The invention includes also a method for connecting first and second connecting parts wherein the first connecting part has a guide post and the second connecting part has means for receiving the guide post such that when the guide post is received the first and second parts are oriented for connection, which method comprises passing a line through the receiving means of the second part, attaching the line to the guide post by a remotely releasable latching means so that the line extends from the top of the guide post, sliding the second part along the line so as to bring the guide post into the receiving means and thereby orient the parts for connection, connecting the first and second connecting parts, remotely releasing the latching means, and withdrawing the line from the second connecting part.

Where the guide post is separable from the remainder of the first connecting part, the method may include the preliminary step of fitting the guide post therein.

DESCRIPTION OF THE DRAWINGS

The invention will be illustrated by the following description of a preferred embodiment with reference to the accompanying drawings in which.

DETAILED DESCRIPTION OF PREFERRED EMBODIMENTS

Figure 1:
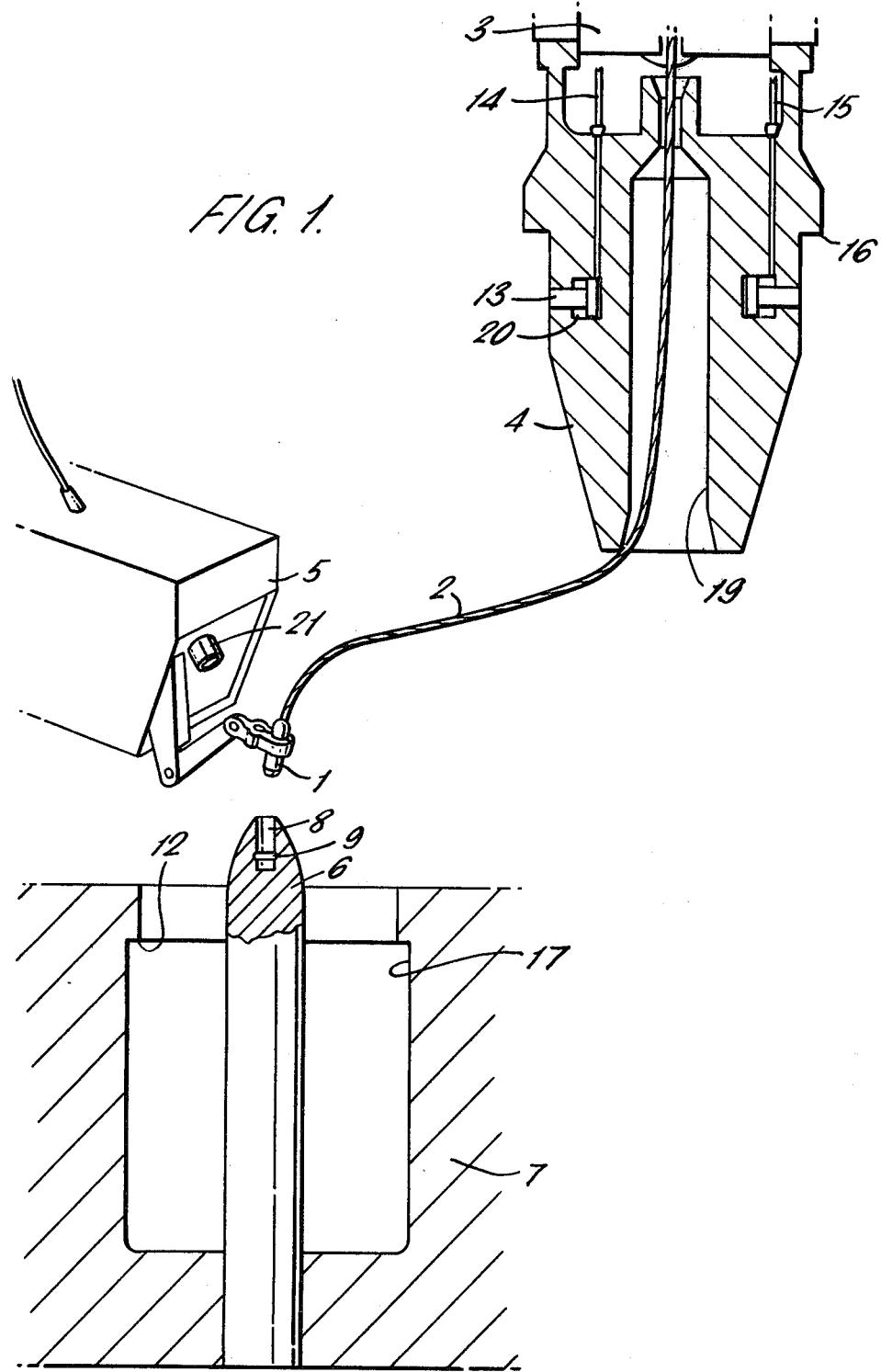
FIG. 1 shows an assembly according to the invention prior to connection, first and second connecting parts being sectioned.

Referring to FIG. 1, a connection is being established between first connecting part 7 incorporated in a seabed anchor and second connecting part 4 attached to the end of a steel pipe 10 deployed from a surface vessel.

First connecting part 7 comprises a cylindrical socket 17 having a slightly restricted opening by virtue of an inwardly projecting shoulder 12. Centrally disposed in the socket and extending from the socket base through the socket opening is a guide post 6 having a smoothly tapered top in which is an axial bore 8, which may be as shown or which may extend deeply into or throughout the length of the post to avoid the bore becoming blocked by sediment. In the bore 8 there is a portion of an enlarged diameter constituting a latch groove 9. The guide post 6 is steel and the anchor or foundation base providing the socket 6 is also of steel.

Second connecting part 4 is attached to the end of a section of steel hollow pipe 10 by a universal joint 3 and takes the form of a hollow cylindrical plug with a frusto-conical tip having an axial bore 19 therethrough and a projecting circumferential shoulder 16. Between the shoulder 16 and the frusto-conical tip is a hydraulic latch 20 comprising dogs 13 having a retracted position flush with the surface of the plug and a projecting position. Hydraulic pipes 14 and 15 are provided for operating dogs 13.

Threaded through hollow pipe 10 and bore 19 is a line 2 terminating in a mandrel 1. Line 2 is a cable with a hydraulic hose core by means of which a radially expanding hydraulic latch on mandrel 1 may be operated to expand or to contract. Mandrel 1 is shown being gripped by a manipulator 5 of an R.C.V. equipped with a television camera 21.

In use, the mandrel 1 and wire-reinforced hydraulic hose (guide wire) 2 are uncoiled from a winch at the surface (not shown) through pipe 10 (not shown) universal joint 3 and second connecting part 4. The RCV with manipulator 5 grasps the mandrel 1 and inserts it into bore 8 of guide post 6 in which to locate the mandrel 1.

Figure 2:
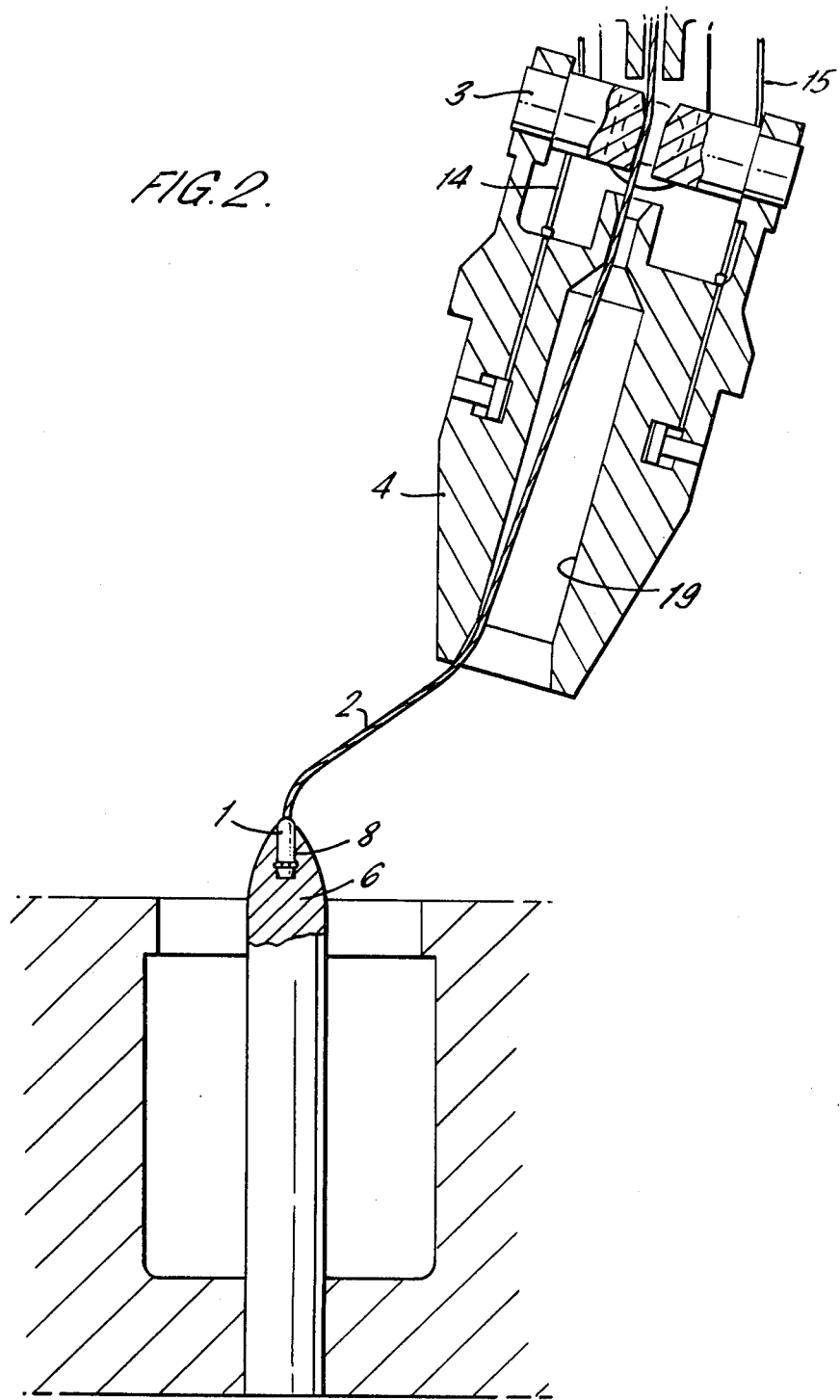
FIG. 2 shows the same parts at an early stage in the course of connection.

In FIG. 2 the mandrel 1 is shown latched into the location bore 8 at the top of post 6 by applying hydraulic pressure down hose 2. Tension is then pulled in wire re-inforced hose 2 by the winch at the surface (not shown). Pipe 10 now moves laterally to a position more directly above the guide post 6.

Figure 3:
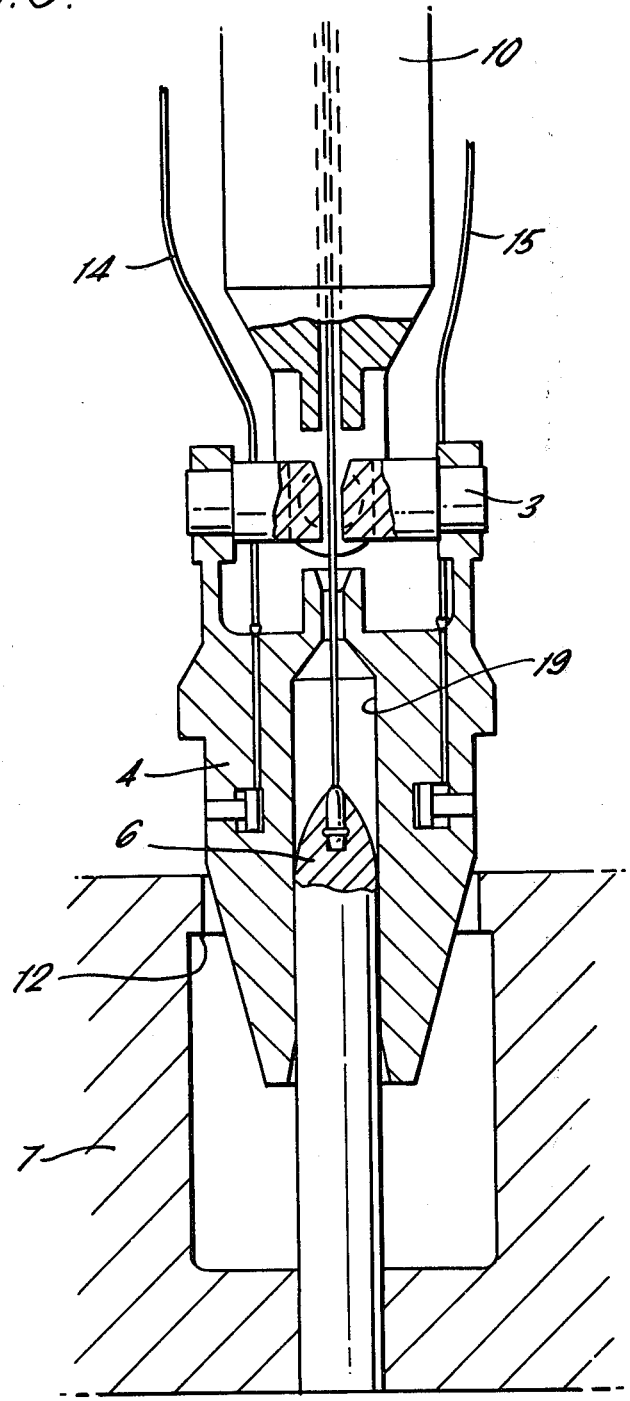
FIG. 3 shows the parts at a later stage in the course of connection.

When the bore 19 of the second connecting part has engaged the guide post 6, as shown in FIG. 3, the pipe 10 is directly over and oriented with first connection part 7. Vertical motion of the structure 10 due to surface waves and swell is now transmitted through the universal joint 3 to second connecting part 4 which is constrained to move co-axially with guide post 6.

Figure 4:
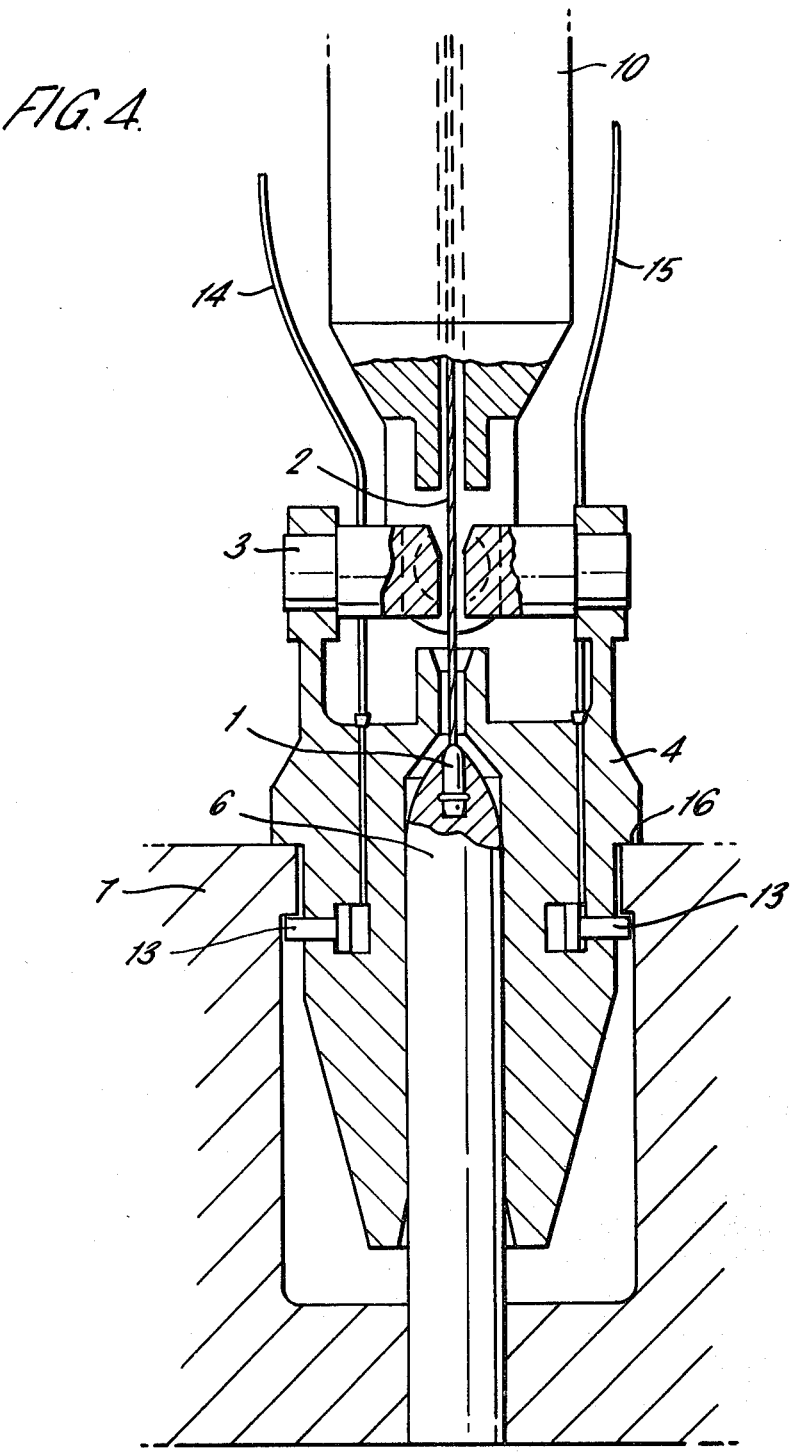
FIG. 4 shows the connection established.

Increasing tension of wire-reinforced hose 2 and/or lowering pipe 10 e.g. by decreasing the bouyancy of a structure to which it is attached causes further engagement of the second connecting part 4 onto the guide post 6, until locking dogs 13 are able to engage the shoulder 12 (See FIG. 4). Locking dogs 13 are actuated by application of fluid pressure to hose 14, or can be unlocked by application of fluid pressure to hose 15 so that structure 10 can be released from anchor or foundation 7 at a later date. Alternatively, many other forms of hydraulically or mechanically-actuated connecting devices can be used.

The geometry of the guide post 6 and second connecting part 4 have been chosen such that substantial engagement can be obtained to align these two parts prior to connection being made and to accept some vertical motion due to heave without causing disengagement. The post is dimensioned for adequate strength but sufficiently slender to reduce the tendency to 'cross-lock' or 'stick' as experienced with short, wide drawers.

By positioning the post 6 inside the socket in the foundation, and by keeping the locking dogs 13 and thrust face 16 as close to the universal joint as possible, the post 6 is protected against damage by trawl boards, etc., prior to structure installation, and bending moments at the point of connection i.e. thrust faces 16 and locking dogs 13, (due to lateral loads transmitted through the universal joint 3), are kept to a minimum.

When the locking dogs 13 have successfully engaged the connection means 12, the pipe 10 is correctly connected to the foundation or anchor. Release of hydraulic pressure in wire re-inforced hose 2 allows recovery of the mandrel 1 and hose 2 to the surface winch (not shown).

It should be noted that using the assembly described above, the pipe and universal joint may initially be tens of feet from the connecting part on the foundation but the tension in the wire will first pull the universal joint and second connecting part towards the guide post against current forces, and will later pull the second connecting part, pipe and any attached structure down from the previous floating position until the lower part of the universal joint engages the guide post. The post may incorporate helical cam means to engage a follower inside the second connecting part to orientate the pipe relative to the foundation (e.g. to align jumper hose connections).

Increasing tension in the wire or decreasing the buoyancy of the pipe will allow the two parts of the connector to mate with correct alignment guaranteed by the post and internal mating surfaces of the two connecting parts.

When connection has been made, the pressure in the guide wire may be released, and the mandrel and wire raised to the surface using the winch for re-use and structure re-installation as required.

The invention includes a marine structure tethered to or supported on the seabed by one or more connections formed between first and second connecting members by a method as described above. The marine structure may be a hydrocarbon production, drilling transportation or flaring facility.

I claim:

1. A connector assembly comprising first and second connecting parts together with means for laterally aligning the connecting parts for connection together, the first connecting part having a guide post and the second connecting part having means for receiving the guide post such that when the guide post is received the first and second connecting part are laterally and angularly oriented for connection, wherein the first and second connecting parts are adapted to lock together and wherein the lateral alignment means comprises a line provided with a remotely releasable latching means by which the line is releasably attached to the guide post so that the line extends therefrom and may be passed through the receiving means of the second connecting part and the second connecting part may then be slid down the line so that the guide post is thereby brought into the receiving means and the two parts thereby laterally and angularly oriented for connection and after connection the latching means may be released and the line withdrawn through the second connecting part.

2. An assembly as claimed in claim 1 wherein the latching means is actuateable remotely both to attach and release the line to and from the guide post by application or removal of fluid pressure.

3. An assembly as claimed in claim 1 wherein the latching means is a mandrel attached to the line and provided with a radially expandable portion and attachment is made to the guide post by engagement of the radially expandable portion in the guide post.

4. An assembly as claimed in claim 1 wherein the latching means comprises gripping means and attachment is made to the guide post by engagement of the gripping means over a part of the guide post.

5. An assembly as claimed in claim 1 wherein the first connecting part comprises a socket having a mouth and having the guide post extending through the said mouth and the second connecting part comprises a plug adapted to be received in said socket and the receiving means is a bore therein, the second connecting part also comprising a continuation of said bore allowing passage of the line through the second connecting part.

6. An assembly as claimed in claim 1 wherein the first connecting part is provided in an anchor member for mounting on the seabed and the second connecting part is provided in a hollow marine structure.

7. An assembly as claimed in claim 6 wherein a flexible joint is provided between the second connecting part and the said marine structure.

8. A method for connecting first and second connecting parts wherein the first connecting part has a guide post and the second connecting part has means for receiving the guide post such that when the guide post is received the first and second parts are laterally and angularly oriented for connection, which method comprises passing a line through the receiving means of the second part, attaching the line to the guide post by a remotely releasable latching means to that the line extends from the top of the guide post, sliding the second part along the line so as to bring the guide post into the receiving means and thereby orient the parts for connection, connecting the first and second connecting parts to form a locked connection, remotely releasing the latching means, and withdrawing the line from the second connecting part.

9. A method as claimed in claim 8 wherein the connection between the first and second connecting parts is effected under water.

10. A marine structure tethered to or supported on the seabed by one or more connections formed between first and second connecting members by a method as claimed in claim 8.

11. A connector assembly comprising first and second connecting parts together with means for aligning the connecting parts for connection together, the first connecting part having a guide post and the second connecting part having means for receiving the guide post such that when the guide post is received the first and second connecting parts are oriented for connection, wherein the first connecting part has a socket having an open mouth for receiving the second connecting part, and the guide post extends from the base of the socket, and wherein the alignment means comprises a line provided with a remotely releasable latching means adapted to be releasably attached to the guide post so that the line extends therefrom and wherein the line may be passed through the receiving means of the second connecting part and the second connecting part may then be slid down the line so that the guide post is thereby brought into the receiving means and the two parts thereby oriented for connection and after connection the latching means may be released and the line withdrawn through the second connecting part.

12. A method of anchoring a marine structure to the sea bed which method comprises providing anchor means on the sea bed incorporating a first connecting part comprising a socket having extending from the base thereof a guide post connecting a guide line to the guide post by a remotely releasable latch means passing a hollow tension leg mooring member terminating in a second connecting part comprising means for receiving the guide post over the guide line so that the guide post is received in the said receiving means whereby the first and second connecting parts become correctly oriented for connection, forming a connection between the first and second connecting parts capable of resisting anchorage loadings, in the said tension leg mooring member releasing the latch connection between the guide post and guide line and withdrawing the guide line through the hollow tension leg mooring member.

13. A method as claimed in claim 8 wherein the attachment of the line to the guide post by means of the latch means is carried out by means of a remotely controlled submersible vehicle.

* * * * *